US007146576B2

(12) United States Patent
Chang et al.

(10) Patent No.: US 7,146,576 B2
(45) Date of Patent: Dec. 5, 2006

(54) AUTOMATICALLY DESIGNED THREE-DIMENSIONAL GRAPHICAL ENVIRONMENTS FOR INFORMATION DISCOVERY AND VISUALIZATION

(75) Inventors: Nelson Liang An Chang, Palo Alto, CA (US); Amir Said, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 538 days.

(21) Appl. No.: 10/021,224

(22) Filed: Oct. 30, 2001

(65) Prior Publication Data

US 2003/0081010 A1    May 1, 2003

(51) Int. Cl.
 *G06F 3/00*  (2006.01)
 *G06F 17/00*  (2006.01)
(52) U.S. Cl. .................. 715/848; 715/757; 715/782; 715/850; 715/852
(58) Field of Classification Search ............. 345/757, 345/764, 765, 782, 810, 836, 848, 849, 852, 345/853
See application file for complete search history.

(56) References Cited

U.S. PATENT DOCUMENTS

| | | | |
|---|---|---|---|
| 5,671,381 A * | 9/1997 | Strasnick et al. | 345/848 |
| 5,835,094 A * | 11/1998 | Ermel et al. | 345/848 |
| 5,838,317 A * | 11/1998 | Bolnick et al. | 345/764 |
| 5,848,399 A | 12/1998 | Burke | |
| 6,054,989 A * | 4/2000 | Robertson et al. | 345/848 |
| 6,058,397 A * | 5/2000 | Barrus et al. | 707/104.1 |
| 6,097,393 A * | 8/2000 | Prouty, IV et al. | 345/419 |
| 6,295,062 B1 * | 9/2001 | Tada et al. | 345/835 |
| 6,608,640 B1 * | 8/2003 | Nagahara et al. | 345/848 |
| 6,621,509 B1 * | 9/2003 | Eiref et al. | 345/836 |
| 6,785,667 B1 * | 8/2004 | Orbanes et al. | 707/1 |
| 2002/0054163 A1 * | 5/2002 | Yamada et al. | 345/848 |
| 2002/0075312 A1 * | 6/2002 | Amadio et al. | 345/764 |
| 2002/0091679 A1 * | 7/2002 | Wright | 707/3 |
| 2002/0105533 A1 * | 8/2002 | Cristo | 345/706 |
| 2002/0163546 A1 * | 11/2002 | Gallo | 345/848 |

OTHER PUBLICATIONS

Mass et al, "VRCommerce—Electronic Commerce in Virtual Reality", Nov. 1999, ACM Press, Proceedings of the 1st ACM conference on Electronic commerce, pp. 103-109.*
3D2U, "3D2U Virtual Galleria", Oct. 17, 2000, 3D2U Media Inc., http://web.archive.org/web/20001017172234/http://www.3d2u.com/.*
Koiso et al: "Dynamic Generation of Virtual Space and Incremental Query Formulation Using Spatial Browsing" Database and Expert Systems Applications, 1998. Proceedings Ninth International Workshop on Vienna, Austria 26-28th. pp. 949-956. XP010296749.
Shiode N. et al: "Utilizing the Spatial Features of Cyberspace for generating a Dynamic Museum Environment" Proceedings of Fourth Symposium on the Virtual Reality Modeling Language 23-26 Feb. 1999, pp. 79-84 XP003365952.

* cited by examiner

*Primary Examiner*—Tadesse Hailu
*Assistant Examiner*—Alvin H Tan (57) ABSTRACT

An apparatus and method for browsing a plurality of data objects represented by images displayed within a three-dimensional graphical environment is described. A plurality of data object arrangement schemes are provided for arranging corresponding represented images of the data objects within the three-dimensional environment dependent on a selected one of the schemes. The data objects are then automatically arranged within the three-dimensional environment according to the selected schemes. Schemes can be user selected such that by selecting a new scheme, the objects are rearranged according to the newly selected scheme. The environment is partitioned into three-dimensional areas and representative images of the data objects are arranged within the partitioned environment such that representative images of related groups of data objects with respect to the selected scheme are displayed within the same areas.

13 Claims, 4 Drawing Sheets

FIG. 5D

AUTOMATICALLY DESIGNED THREE-DIMENSIONAL GRAPHICAL ENVIRONMENTS FOR INFORMATION DISCOVERY AND VISUALIZATION

FIELD OF THE INVENTION

The present invention relates to a technique for generating a three-dimensional graphical environment and in particular, this disclosure provides an apparatus and method for automatically generating three-dimensional graphical environments for information discovery and visualization dependent on a selected viewing scheme.

BACKGROUND OF THE INVENTION

Databases are often used to store information relating to large numbers of objects such as products, works of art, museum pieces, or books. Due to their size, it can be difficult to search or browse through the information stored in these databases. There are usually specialized interfaces for visualizing the information depending on the application. However, there are some universally desirable features of the interface regardless of the application. It should enable the user to navigate and browse through the database quickly. It should be visually compelling and interactive to allow the user to effortlessly manipulate the visualization. Finally, it should be an intuitive interface.

A particularly important application of information visualization is in the area of shopping. People interested in shopping used to have only the option of going to their local brick-and-mortar stores to shop. When the Internet revolution occurred, it was thought that online shopping could provide the shopper with much better ways to visualize and browse through a store's inventory. Online shopping did not end up overtaking traditional brick-and-mortar stores as expected simply because it could not replace many of the inherent benefits of regular shopping. Traditional stores are professionally designed and have very pleasant layouts. A visually immersive experience and natural way of navigating makes shopping in these stores very appealing. In many cases, shoppers do not have a specific item in mind and may want to simply "window shop" through the products. In fact, shoppers quite often discover items they wish to purchase purely by accident; the brick-and-mortar stores are very conducive for browsing and this type of "accidental discovery."

Current online shopping is certainly not without its merits, and consequently, many retail stores have created an online presence as well. Online shopping can be quickly accomplished in the comfort of one's own home or office at any time, day or night. Online stores can provide a much wider selection and larger inventory since they require zero physical store space; this in turn generally leads to lower prices. Current online stores often include a web-based user interface that allows the user to "browse" through lists or images of products by category. Specifically, if a user selects a category using the interface, either a written list of products or images representing the products are displayed that fall within the selected category. Alternatively, the user interface can include a search engine that allows the user to perform a word or term search to locate a specific product or category within the database. Such a search engine is very efficient when the shopper knows precisely the model of the object to be purchased.

There are many problems associated with the above browsing and searching techniques. For instance, if a user does not know what category the product that they are looking for falls into, they must either guess which category to look through or look through each list of products for each category until the desired product is found. In addition, the user may not know the exact terminology used to describe the desired product on the website and as a result, the term/word search engine can become useless. As a result, due to the size of the database of products and the manner in which the user interface is designed, it becomes a cumbersome task requiring the user to navigate through continuous windows of web pages of product information. In the case of accidental discovery, the above described search tools are not even applicable and current browsing techniques become inadequate or cumbersome.

Users encounter a different browsing experience when viewing images, such as artwork, on a website. In this case, the user is typically not searching for a specific item but instead is simply randomly viewing the objects (i.e., artwork) of the database. As a result, the above browsing and searching techniques are particularly unsuited for this type of viewing experience since the user is not searching for any specific object.

A much more compelling interface is the use of interactive three-dimensional graphical environments, which combine many of the benefits of online shopping with those of brick-and-mortar stores. Three-dimensional graphical (or virtual) environments have been used in the past to allow viewing of and navigation through information in an intuitive manner. Specifically, a three-dimensional graphical environment allows a user to intuitively navigate within a virtual space and hence easily locate and view items within the space, thus overcoming the disadvantages of browsing and searching by category and search engines. Even the most novice computer user can appreciate its immersive and natural interface.

Many three-dimensional graphical environments, especially those found in the gaming and entertainment industries, possess the "look and feel" of a real-world environment, and in fact can be quite visually stunning. However, these environments are predesigned and predetermined for their specific application. As a result, the user's experience is restricted to the designer's preconceived ideas as to how to best arrange the environment for optimized navigation, searching, browsing, and accidental discovery. If the user's and designer's views are different, then the user's experience within the environment may be diminished. Moreover, such static environments cannot easily accommodate dynamically changing data objects and user customization. Hence, what would be desirable is a customizable and automatically designed three-dimensional graphical environment based on user preferences.

The present invention is an apparatus and method of automatically generating a three-dimensional graphical environment for viewing a plurality of objects in a database having improved browsability.

SUMMARY OF THE INVENTION

An apparatus and method for browsing a plurality of data objects represented by images displayed within a three-dimensional graphical environment is described. A plurality of data object arrangement schemes are provided for arranging representative images of the data objects within the three-dimensional graphical environment dependent on a selected one of the schemes. The data objects are then arranged within the three-dimensional graphical environment according to the selected scheme. Schemes can be user selected such that by selecting a new scheme, the objects are rearranged according to the newly selected scheme. In one embodiment, the environment is partitioned into three-dimensional areas and representative images of the data objects are arranged within the partitioned environment such that representative images of related groups of data objects with respect to the selected scheme are displayed within the same areas.

In one embodiment, an apparatus for browsing a plurality of stored data objects within a displayed three-dimensional graphical environment includes a plurality of selectable data object arrangement schemes and a three-dimensional graphics processing unit. The graphics processing unit generates three-dimensional image data corresponding to the environment and representative images of the data objects such that the representative images are arranged within the displayed environment dependent on a selected one of the schemes.

In another embodiment, the graphics processing unit includes two processing units: first, a layout processor for determining the layout of the environment and the placement of the representative images of the objects within the environment; and second, an environment creation processor for determining the appearance of the environment and representative images within the environment. The layout processor includes an environment partitioner for generating environment partition information corresponding to partitioned three-dimensional areas within the environment and an object placement locator for generating information corresponding to the location of related objects within each partitioned area.

DETAILED DESCRIPTION

An apparatus and method for browsing representative images of data objects within a displayed three-dimensional graphical environment is described in which images are arranged within the environment according to a selected one of a plurality of data object arrangement schemes. According to this description, a data object is broadly defined as data stored within a database that corresponds to a tangible or intangible object or element. Examples of types of data objects can include but are not limited to image data, audio data, word processing data, video data, and 3-D models. Examples of types of objects or elements can include but are not limited to movie videos, CDs, works of art, electronic word processing documents, electronic personnel records, and commercial inventory. If, for instance, the object type is movie videos, a specific object of that type would be a particular movie.

Each data object has associated data referred to as metadata which corresponds to any data other than the data object itself that describes or relates to the data object, and each data object may have different types of metadata. For instance, in the case in which the object type is movie videos, types of metadata may include data corresponding to the title of the movie, director of the movie, the release date of the movie, the actors of the movie, genre of movie (e.g., comedy, drama) etc. In contrast, in the case in which the object type is artwork, types of metadata may include title of the work and school of art (e.g. modern, impressionistic). Metadata can be stored with the data object or may be stored separately such that a link exists between the data object and its associated metadata.

In general, a plurality of data objects stored within a database are related such that they can be logically viewed, categorized, grouped and/or arranged in some way with respect to their associated data object or metadata. For instance, movies stored within a database can be grouped according to director so as to allow a viewer to review the data by a particular director.

According to the present invention, representative images of data objects stored within a database are displayed within a three-dimensional graphical environment to provide a user who wants to browse the database the ability to intuitively view the data objects. In accordance with the present invention, representative images can be embodied as text labels, natural images, graphical images, document and file folder images, video images, three-dimensional models, or any type of visual data. Moreover, representative images can be interactive when selected by the user. For instance, a representative image embodied as a three-dimensional model may be rotated by a user to provide the user with additional views of the model. In addition, representative images may be selected to access additional related multi-media data. For instance, a two-dimensional representative image may be selected so as to access an audio clip associated with the data object, access a three-dimensional model of the corresponding two-dimensional image, access a video sequence, etc.

Figure 1:
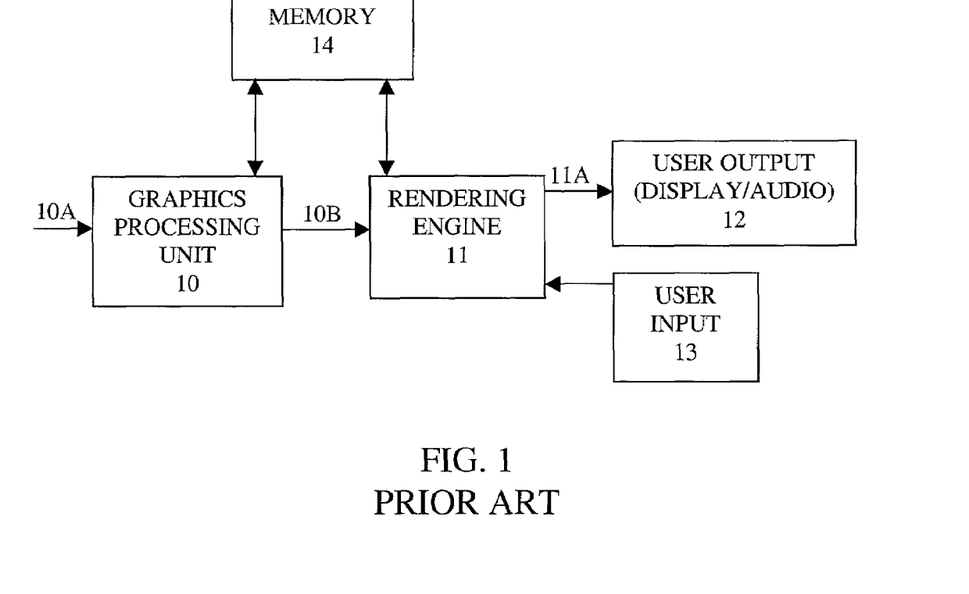
FIG. 1 illustrates a prior art system for rendering and displaying a three-dimensional graphical environment.

An example of a system for rendering and displaying a three-dimensional image is shown in FIG. 1 that includes a graphics processing unit 10, a rendering engine 11, a user output 12, a user input 13, and memory 14. The graphics processing unit 10 functions to receive data object data 10A and generate three-dimensional imaging data 10B corresponding to a three-dimensional graphical environment including representative images of the data objects within the three-dimensional environment as is well known in the field of graphics imaging. Rendering Engine 11 receives imaging data 10B and generates rendering data 11A for driving user output 12. For instance, rendering data 11A drives a monitor (not shown) to display the three-dimensional graphical environment including the representative images. User input 13 provides an interface between a user and the three-dimensional environment so as to allow the user to interact with the three-dimensional environment. For instance, the user input 13 allows the user to change a point of view within the three-dimensional environment by moving a displayed cursor using a keyboard or mouse. Other types of user input 13 include but are not limited to a joystick and a pressure sensitive screen. Graphics processing unit 10 may function to generate the representative images of the data objects or the representative image data may be stored within the memory 14 and linked to the data object database.

Figure 2:
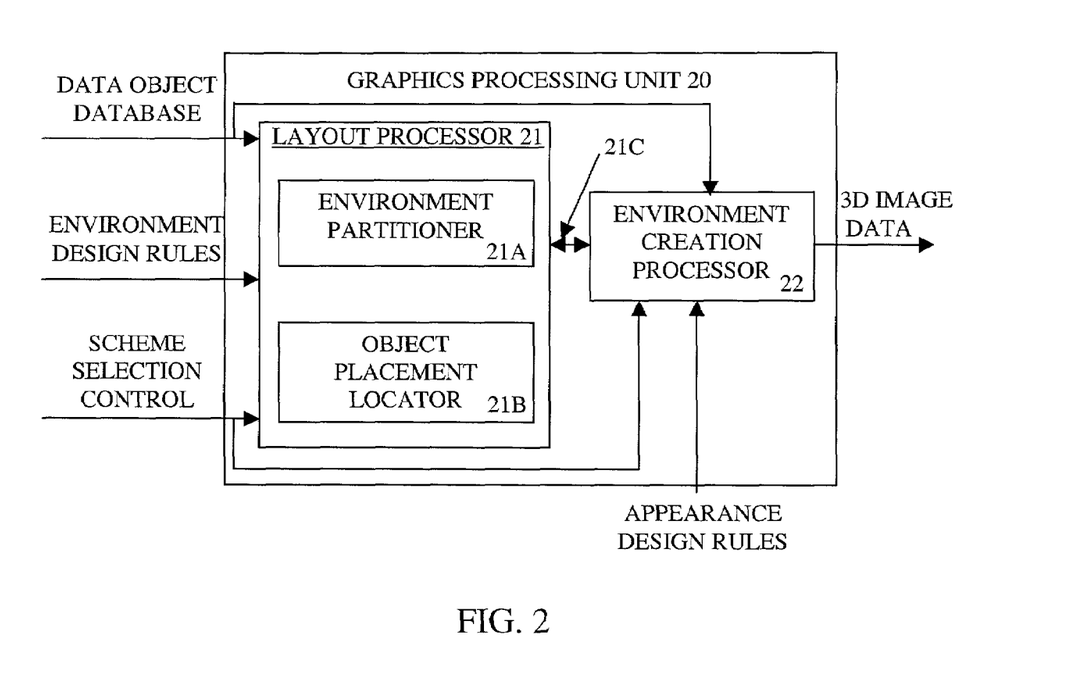
FIG. 2 illustrates a first embodiment of an apparatus for generating a three-dimensional graphical environment according to the present invention.

According to one embodiment of the present invention, graphics processing unit 10 is implemented according to the apparatus 20 shown in FIG. 2 including a layout processor 21 and an environment creation processor 22. The layout processor 21 functions to generate three-dimensional imaging information 21C defining, at least, the partitioning information of the three-dimensional graphical environment and placement information defining the placement of representative images corresponding to a plurality of data objects within the partitioned three-dimensional environment. Both of the partitioning information and the placement information are dependent on at least a selected one of a plurality of data object arrangement schemes. Data object selection is determined by the data object scheme selection control signal coupled to the layout processor 21. Selection of the type of arrangement scheme determines the manner in which the environment is partitioned by layout processor 21 and determines the placement of representative data objects within the partitioned areas. According to the present invention, different arrangement schemes correspond to ways of relating data objects to one another within a database so as to group the data objects dependent on their relations. In one embodiment, metadata is used to relate objects so as to group the data objects.

In one embodiment, the partitioning and placement within the layout is also dependent on a set of environment design rules (FIG. 2) that define the placement of any object within the environment. For example, to create a partitioned area within the three-dimensional graphical environment, an object (such as a wall) is used. In this case, an environment design rule would, for example, ensure that walls/objects are not too close or overlapping, determine how or whether to insert corridors within the environment to allow passage from one partitioned area to another, ensure that representative images of data objects are not too close/overlapping, reduce the occurrence of long skinny rooms in preference for squarer rooms, etc. In another example, the environment design rules can specify the locations of particular departments in a store (e.g. the men's department is always in the northwest corner, or the produce section of a virtual grocery store is always on the west side, etc). Similarly, the environment design rules can ensure that a virtual store is laid out in a similar manner as a user selected brick-and-mortar store at a specific location.

In another embodiment, the selected data object arrangement scheme is based on at least one metadata type according to which the data objects are to be grouped and displayed. Once the metadata type is identified, the environment partitioner 21A analyzes the metadata for all data objects to identify data objects having the same metadata for the identified metadata type. Data objects identified as having the same metadata are grouped together. The number of data objects in each group is determined and the size of each partitioned area required to accommodate each group of objects is determined. From the size information for each of the partitioned areas, the environment partitioner 21A generates coordinate information within the three-dimensional graphical environment. The coordinate information is provided to the object placement locator 21B. The object placement locator 21B then determines the placement of the grouped data objects within each area dependent on the environment design rules.

Layout information 21C is coupled to the environment creation processor 22. Environment creation processor 22 uses the partition information including coordinate information and placement information to generate three-dimensional image data representing the partitions that are located according to the coordinate information provided by environment partitioner 21A. The appearance of the three-dimensional graphical environment is determined by appearance design rules (FIG. 2) that determine the appearance of the three-dimensional environment and how the objects and text within the environment are to appear dependent on a selected motif or theme. For instance, if a database of movie videos is being displayed within a three-dimensional environment, and the appearance rules are set such that the motif of a video store is selected, then the environment creation processor may generate three-dimensional image data corresponding to a video store having many rooms and including other objects in the environment that might be identified with a video store. For instance, the three-dimensional video store environment may include a check out desk. In addition, the environment creation processor may generate image data corresponding to walls in the video store for partitioning the video store into three-dimensional areas, and data objects may be represented by a type of video box generally associated with video stores. Alternatively, the environment motif may be an old mansion, an art museum, may be indoors or outdoors. Furthermore, the appearance design rules also determine style of the presented architecture (e.g. gothic, roman, modern), color scheme, and additional fixtures (e.g. columns, gargoyles, trim).

It should be understood that the apparatus shown in FIG. 2 can be implemented in any combination of hardware, software, or firmware.

Figure 3:
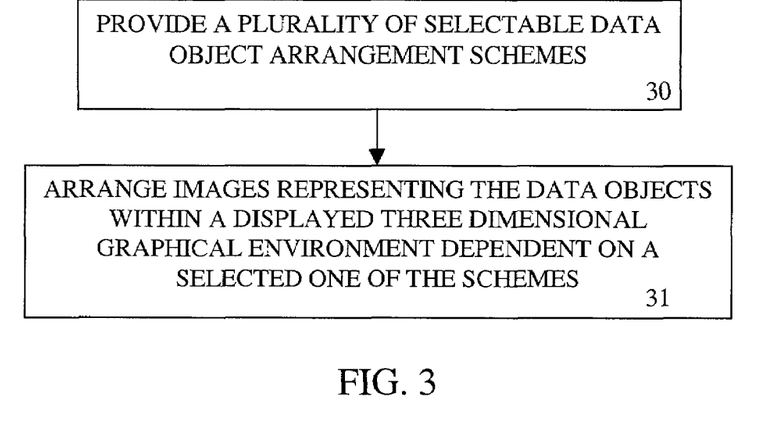
FIG. 3 illustrates a first embodiment of a method for generating a three-dimensional graphical environment.

FIG. 3 shows a first embodiment of a method for browsing a plurality of data objects displayed within a three-dimensional graphical environment. According to this embodiment, a plurality of selectable data objects arrangement schemes are provided (block 30). According to this embodiment, different arrangement schemes correspond to ways of relating data objects to one another within a database so as to group the data objects dependent on their relations. In one embodiment, data objects can be grouped according to metadata type. Provided with different arrangement schemes, images representing the plurality of data objects are arranged within a displayed three-dimensional environment dependent on a selected one of the arrangements schemes (block 31).

An example of the method shown in FIG. 3 may be seen in the case in which a user is browsing a database with an interface providing the user with the option to select one of a plurality of arrangement schemes. For instance, if the database comprises data objects corresponding to museum pieces, the interface may give the user the option to arrange the data objects alphabetically according to piece name or chronologically according to the date that they were discovered or even geographically by country of origin. Representative images of the data objects are then displayed according to the selected one of the schemes. Since the scheme is selectable according to the method shown in FIG. 3, the method allows a user to view the data objects according to any of a plurality of schemes. For instance, the user can decide to view the objects according to a different scheme by selecting a new scheme such that the data objects are rearranged within the three-dimensional graphical environment according to the newly selected scheme.

Figure 4:
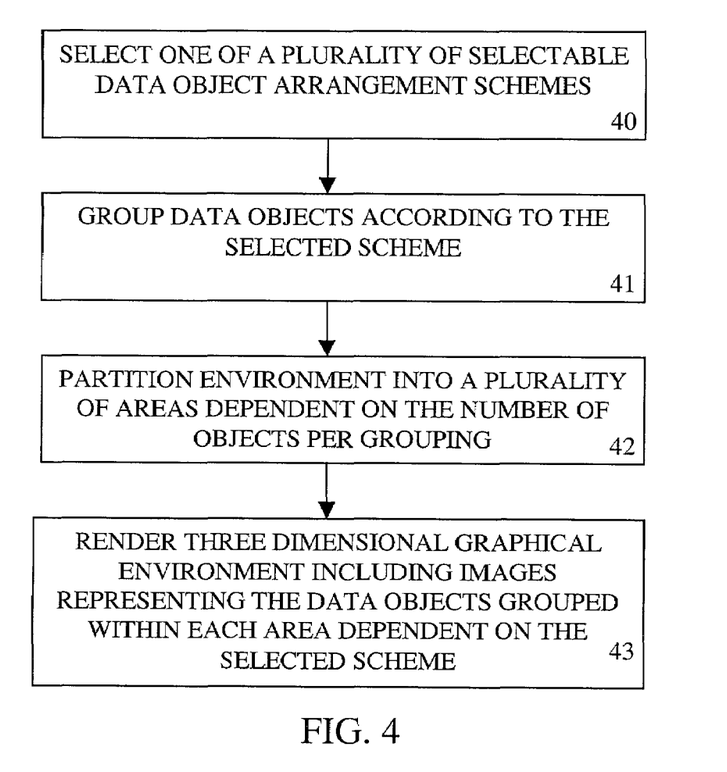
FIG. 4 illustrates a second embodiment of a method for generating a three-dimensional graphical environment.

FIG. 4 illustrates a second embodiment of the method for browsing a plurality objects displayed within a three-dimensional graphical environment. According to this embodiment, a data object arrangement scheme is selected (block 40). For instance, a user interface may include a drop down menu that provides a user with a list of arrangement schemes allowing the user to select a data object arrangement scheme. Next, data objects are grouped according to the selected scheme (block 41). Hence, once the scheme is selected, the data objects are analyzed so as to group data objects according to the selected scheme. The environment is then partitioned dependent on the number of objects per grouping (block 42). Consequently, the size and shape of each partitioned area is dependent on the number of objects per group. The three-dimensional graphical environment is then rendered having representative images of the grouped data objects within each area dependent on the selected scheme (block 43). Hence, the partitioned environment is displayed on a monitor such that the representative images of the grouped data objects are grouped within each area dependent on the selected scheme so as to enable intuitive browsing of the data objects in the database.

Figure 5A:
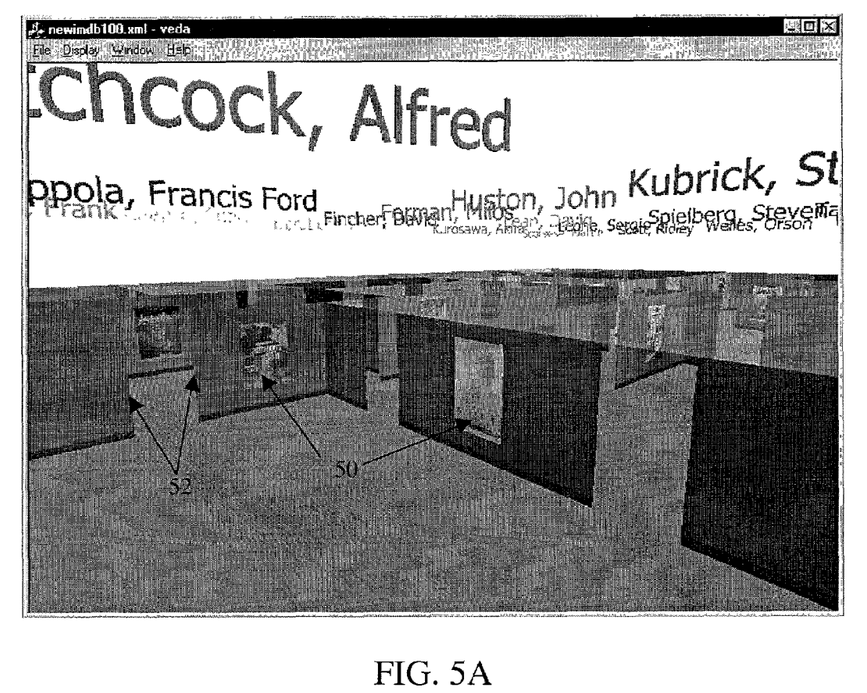
FIGS. 5A–5D illustrate examples of three-dimensional graphical environments embodied according to the apparatus and method of the present invention.
Figure 5B:
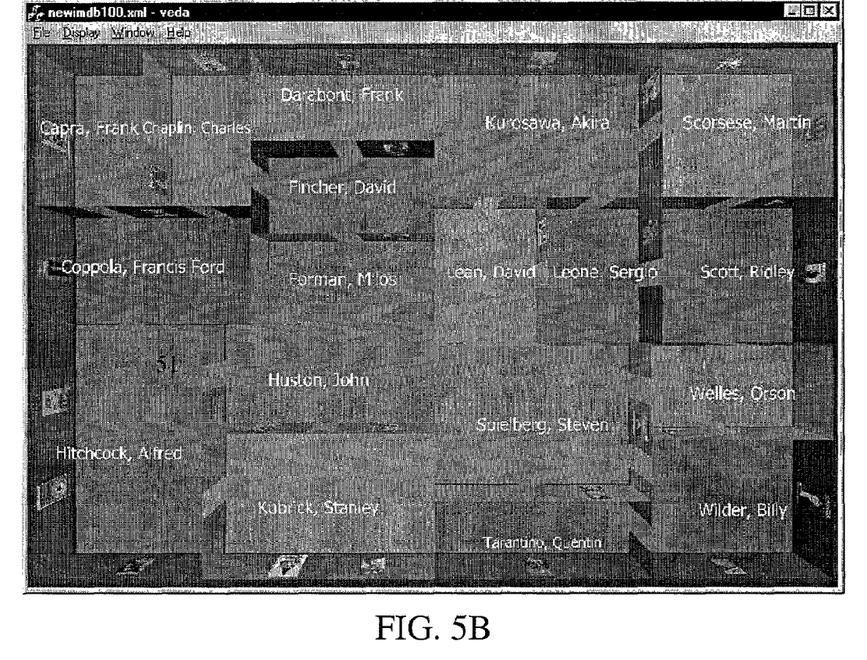
Figure 5C:
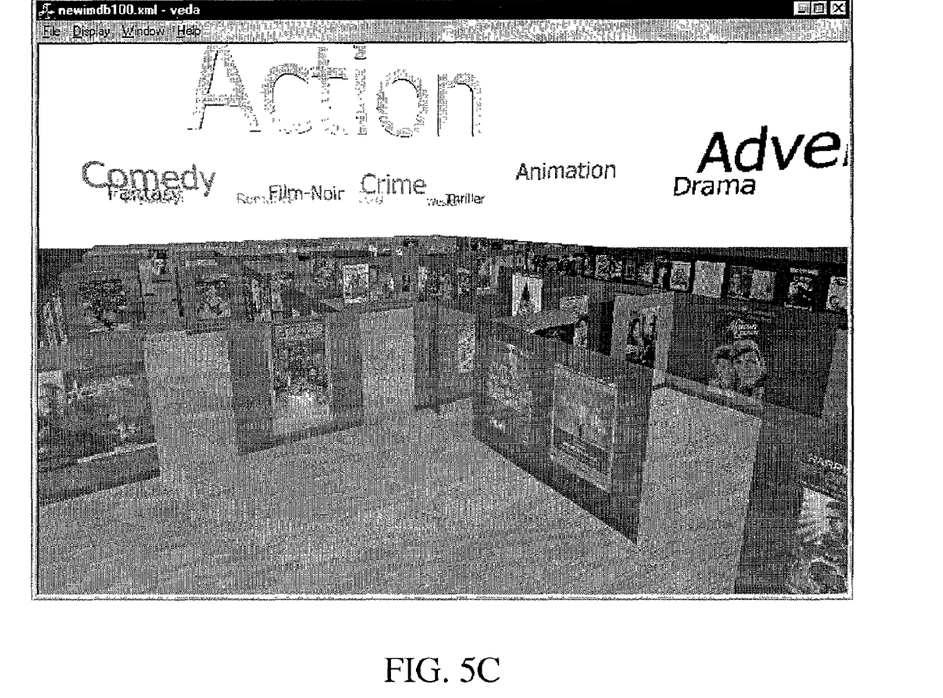
Figure 5D:
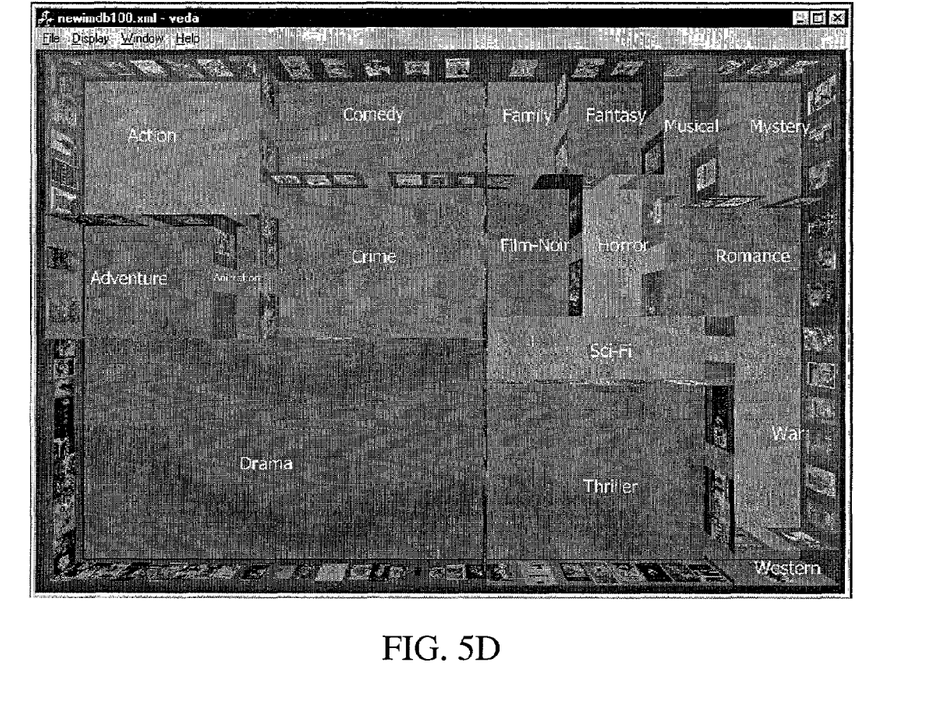

FIGS. 5A, 5B, 5C, and 5D show examples of representative images arranged according to different selected schemes within a three-dimensional graphical environment. As shown in these figures, a plurality of data objects corresponding to movie videos are represented within a three-dimensional graphical environment by images corresponding to cinematic advertising photos 50 (FIGS. 5A–5D) of each movie. In FIGS. 5A and 5B, the three-dimensional environment motif is a video store which is divided into three-dimensional areas (e.g., 51) by store walls 52 where each area corresponds to a different director. Hence, in this case, data objects are grouped according to the arrangement scheme of director type. Note that FIGS. 5A and 5B are different views of the same three-dimensional graphical environment. By selecting this scheme, the user can browse all videos by the same director within each room. FIGS. 5C and 5D shows the same database where representative images within the environment are automatically arranged according to movie genre. For instance, dramas are grouped within the same area, comedies are grouped within another area, and romances are grouped within still another area. Hence, by selecting this scheme, the user can browse only a particular type of movie.

In addition, the data objects within each area can be arranged according to an auxiliary scheme. For instance, in the case of the example shown in FIGS. 5A and 5B, movies by the same director in a given partitioned three-dimensional area can be further arranged according to the release data, the title of the movie, or some other scheme.

It should be noted that schemes may be selected by the user or may be automatically selected dependent on the database being browsed.

In one embodiment of the method of the present invention, when a new scheme is selected, the three-dimensional environment is automatically repartitioned and the representative images of the data objects are rearranged within the three-dimensional graphical environment within the three-dimensional areas dependent on the newly selected scheme.

In the preceding description, numerous specific details are set forth in order to provide a thorough understanding of the present invention. It will be apparent, however, to one skilled in the art that these specific details need not be employed to practice the present invention. In other instances, well-known techniques have not been described in detail in order to avoid unnecessarily obscuring the present invention.

In addition, although elements of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recited only those features regarded as essential to the invention.

We claim:

1. A method for browsing a plurality of data objects displayed within a three-dimensional graphical environment comprising:
    providing a plurality of selectable data object arrangement schemes;
    grouping corresponding images representing the data objects within the environment dependent on a selected one of the schemes;
    wherein grouping representative images further comprising partitioning the three-dimensional graphical environment into three-dimensional bounded areas in a single plane and displaying related groups of representative images within the areas, wherein representative images are related dependent on the selected scheme; and
    determining a size of each area dependent on a number of representative images within each group.

2. The method as described in claim 1 further comprising selecting the data object arrangement scheme through a user interface.

3. The method as described in claim 1 wherein providing arrangement schemes further comprising providing arrangement schemes related to data object metadata.

4. The method as described in claim 1 further comprising rearranging representative images within the environment dependent on a newly selected one of the schemes.

5. The method as described in claim 1 further comprising rearranging the representative images within the environment dependent on a newly selected one of the schemes by repartitioning the three-dimensional graphical environment into three-dimensional areas and redisplaying related groups of representative images within the repartitioned areas, wherein objects are related dependent on the newly selected scheme.

6. The method as described in claim 1 further comprising arranging representative images within each area according to an auxiliary data object arrangement scheme.

7. An apparatus for browsing a plurality of data objects displayed within a three-dimensional graphical environment comprising:
    a plurality of selectable data object arrangement schemes;
    a three-dimensional graphics processing unit for generating three-dimensional image data corresponding to the environment and images representing the data objects such that the representative images are grouped within the displayed environment dependent on a selected one of the schemes, wherein the graphics processing unit includes a layout processor for generating partition information utilized for causing the displayed environment to be partitioned into three-dimensional bounded areas in a single plane dependent on related groups of representative images and for causing the related groups of representative images to be displayed within the areas, wherein the layout processor determines a size of the areas dependent on a number of data objects within each group.

8. The apparatus as described in claim 7 wherein the layout processor further includes:
    an object placement locator for generating placement information for causing related representative images to be displayed within each area dependent on the selected scheme.

9. The apparatus as described in claim 8 wherein the graphics processing unit further includes an environment creation processor for generating three-dimensional image data corresponding to the displayed environment dependent on layout information and dependent on a set of appearance design rules and generating three-dimensional image data corresponding to the representative images grouped within the three-dimensional image data dependent on placement information.

10. A method for browsing a plurality of data objects displayed within a three-dimensional graphical environment comprising:

selecting one of a plurality of selectable data object arrangements schemes;

grouping data objects according to the selected scheme;

partitioning the environment into a plurality of areas dependent on a number of objects per grouping; and rendering the three-dimensional environment including images representing the data objects grouped within each area dependent on the selected scheme.

11. The method as described in claim 10 further comprising selecting the data object arrangement scheme through a user interface.

12. The method as described in claim 10 wherein the arrangement schemes relate to data object metadata.

13. The method as described in claim 11 wherein the arrangement schemes relate to data object metadata.

* * * * *

UNITED STATES PATENT AND TRADEMARK OFFICE
CERTIFICATE OF CORRECTION

| | | |
|---|---|---|
| PATENT NO. | : 7,146,576 B2 | |
| APPLICATION NO. | : 10/021224 | |
| DATED | : December 5, 2006 | |
| INVENTOR(S) | : Nelson Liang An Chang et al. | |

It is certified that error appears in the above-identified patent and that said Letters Patent is hereby corrected as shown below:

In column 6, line 56, after "plurality" insert -- of --.

In column 8, line 56, in Claim 7, after "size" insert -- of each --.

Signed and Sealed this

Fifteenth Day of December, 2009

David J. Kappos
*Director of the United States Patent and Trademark Office*